Patented Aug. 10, 1954

2,686,171

UNITED STATES PATENT OFFICE 2,686,171

COAGULATION OF SULFUR DIOXIDE RESIN LATICES TO PRODUCE A COAGULUM IN CRUMB OR GRANULAR FORM

Willie W. Crouch, Bartlesville, Okla., assignor to Phillips Petroleum Company, a corporation of Delaware No Drawing. Application April 28, 1949, Serial No. 90,275

22 Claims. (Cl. 260—79.3)

This invention relates to the production of synthetic resinous materials formed by reaction between sulfur dioxide and one or more unsaturated organic compounds.

This invention pertains primarily to an improved method of coagulating such a resin when produced by polymerization in an aqueous emulsion.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylannisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

The resins heretofore produced have generally been formed in the presence of only a moderate excess of sulfur dioxide and have been recovered as solid materials possessing a horn-like appearance or having a porous expanded form. These materials are tough and difficult to handle. In order to secure successful commercial products it has been necessary to grind these mechanically in order to form a finely divided material, thus facilitating removal of occluded impurities. Even when ground to a fine powder, it has often been difficult to remove completely all of the occluded impurities, such as uncombined reactants and other materials either present in the reactants as charged to the process or introduced in processing and handling the resin. In some instances it appears that the grinding procedure results in the introduction of minute quantities of metallic impurities which affect the clarity and general appearance of the molded products. Further, the grinding procedure develops undesirable heat which tends to soften the resin and cause the ground particles of resin to fuse, thus increasing the difficulty of the removal of impurities and in some instances resulting in an unsatisfactory molding powder because of particle size. Also, even if the grinding operation results in a satisfactory, fine powder, the removal of occluded impurities is difficult and expensive.

More recently a method has been found, and developed, whereby an unsaturated organic material and sulfur dioxide are caused to react to produce resinous products of varied properties and wide adaptability, said products being readily freed from unreacted reactants and other impurities. The process comprises reacting the unsaturated compound and sulfur dioxide in aqueous emulsion in the presence of suitable catalysts and emulsifying agents. When the reaction is carried out in aqueous emulsion the material remains in a fluid condition and can be agitated readily, thus maintaining adequate contact of the reactants at all stages of the conversion. The resinous product, which is obtained in the form of an emulsion, can be stripped with steam to remove unreacted sulfur dioxide, unreacted unsaturated material, and other volatile impurities. It can also be readily washed and the removal of additional impurities is accomplished in this manner.

Serial No. 8,755 filed February 16, 1948, now Patent No. 2,645,631, granted July 14, 1953, describes and claims the production of a solid heteropolymeric resin resulting from interreaction of sulfur dioxide and a monoolefinic organic material which comprises conducting the reaction with the reactants dispersed in an aqueous emulsion.

By coagulation methods heretofore used, the resin is obtained in a very finely divided form, which is a powder when recovered from the latex. Often this material is so finely divided as to make it very difficult to handle it, since it frequently clogs available filters, or to purify it by washing or other treatment. In addition, since the sulfur dioxide is present to an appreciable extent in the aqueous phase, this is acidic and it is necessary to employ selected emulsifying agents which are effective at low pH, such as long chain alkyl sodium sulfates and the branched chain aliphatic or aromatic sodium sulfonates. However, latices produced using these emulsifying agents are very stable and difficult to coagulate. Methods of coagulating with brine and/or a mineral acid ordinarily fail to coagulate sulfur dioxide resin latices containing these selected emulsifying agents. Such coagulants may be successfully employed in these systems if unusually large quantities are employed, but economic considerations preclude the use of such quantities industrially. Heretofore, the usual method employed for coagulating sulfur dioxide resin latices has been by treatment with a brine-alcohol medium by which method is obtained a satisfactory finely divided coagulum. However, since this method requires rather large amounts of alcohol, the additional cost of providing and operating a recovery system for removing the alcohol from the serum must be borne. Further, an appreciable additional expense is represented by the alcohol left in the wet coagulum and lost during the drying of the polymer.

I have now discovered a rapid, economical process for coagulating resin latices produced by the emulsion polymerization of an unsaturated organic material and sulfur dioxide, herein generally referred to, for convenience, as sulfur dioxide resins, particularly those in which surface active organic sulfates and sulfonates are present as emulsifying agents. By a preferred embodiment of my invention a relatively small quantity of a water-soluble salt of a polyvalent metal is employed as coagulant. The coagulation is effected rapidly and completely by causing the latex and a polyvalent metal salt or its aqueous solution to be mixed with agitation. By suitably correlating the temperature of the coagulation with the specific sulfur dioxide resin being coagulated, and controlling the coagulation temperature, a granular product of a controlled, or of a desired, particle size can be produced.

An object of my invention is to produce a granular resin from sulfur dioxide and an unsaturated organic material.

Another object of my invention is to coagulate a resin from a latex.

A further object of my invention is to control the particle size of a sulfur dioxide-unsaturate resin produced by emulsion heteropolymerization.

Further objects and advantages of my invention will become apparent, to one skilled in the art, from the accompanying disclosure and discussion.

I have found that a critical factor of my invention is the temperature range in which the coagulation is effected, and this range is different from each particular resin. The proper temperature for coagulation appears to be connected with the softening or melting temperature of the resin, which is best identified as the minimum molding temperature of the resin. When the coagulation temperature is no more than a few degrees below this temperature, the resin particles agglomerate into large, unmanageable masses. A workable crumb, or coarse powder, is obtained from 15 to 50° F. below the minimum molding temperature of the resin. If too low a temperature is employed the coagulum is always obtained in the form of extremely fine particles instead of the desired coarser crumb-like coagulum. On the other hand, if too high a temperature is employed the latex coagulates in the form of undesirably large lumps or as a single mass. Broadly, the temperature range in which the sulfur dioxide resin latices are coagulated to obtain the desired granular coagula lies between about 110° F. and about 275° F. The temperature range which applies to a specific sulfur dioxide resin is usually much narrower as, for example, the range from about 140° F. to 175° F. applicable in the coagulation of 1-butene-sulfur dioxide resin latex, and the outside limits of 110° F. and 130° F. applicable when coagulating 1-octene-sulfur dioxide resin latex. The minimum molding temperatures of these two resins are 195° F. to 200° F. and about 135° F. respectively. The average minimum molding temperatures for other olefin-sulfur dioxide resins include 190° F. for a resin produced from a mixture of equal weights of 1-butene and 1-octene, 190° F. for the resin from 1-pentene, 220° F. for 2-pentene, 170° F. for 1-hexene, and 80° F. for 1-dodecene. The temperature of coagulation should, therefore, be below the minimum molding temperature of the resin coagulated and so correlated with this minimum molding temperature as to produce a coarse granular material or a crumb, and not so much lower as to produce a fine powder or so near this minimum molding temperature as to produce large, dense and coherent lumps or masses which cannot be easily crumbled. As a fine powder is usually meant a material having an average particle diameter less than 10 microns, and as a mass which can be easily crumbled is one that can be crumbled between the fingers. Somewhat more generally, powders which are too fine will rapidly clog a usual filter, when an attempt is made to filter the coagulated latex, and the noncrumbly mass resembles a fused mass which requires substantially the same effort and apparatus to crush as does the horn-like resin produced by polymerization of the unsaturate and sulfur dioxide in a homogeneous mass.

When the coagulation is carried out by the addition of a salt of a multivalent metal, it appears that the metal reacts with and precipitates the emulsifying agent, thereby removing it from solution and destroying its emulsifying effectiveness. The salt used may be any water-soluble salt of a metal in group II, group IIIB, or group IVB of the periodic table, as set forth in "Modern Inorganic Chemistry," by J. W. Mellor (Longmans Green & Co., 1939), page 118; and particularly effective are salts of aluminum, calcium, magnesium, lead, strontium and barium.

Although it is usually preferred to add the salt of such a polyvalent metal in the form of its aqueous solution, according to my invention, a solid coagulant also may be employed to produce satisfactory results when properly handled. When an aqueous solution is employed, the concentration of the coagulant solution may be as low as one weight per cent or less or as high as saturation permits, although concentrations from 1 to 15 weight per cent are usually preferred. The amount of coagulant employed in my process lies in the range from 90 to 250 per cent of the weight stoichiometrically required to react with all the emulsifying agent present. It is an important advantage of my process that the said amount of coagulant required is much smaller than the amount of coagulant required in processes employing a brine-acid or brine-alcohol medium.

The sulfur dioxide resin latices produced using organic sulfate and sulfonate emulsifying agents are particularly applicable in my invention. Examples of these compounds are the long chain alkyl sulfates and sulfonates, the alkaryl sulfonates, and the sulfated and sulfonated esters, amides and amines. Specific compounds include sodium tetradecane sulfonate, sodium lauryl sulfate, sodium dodecyl benzene sulfonate, sodium dodecyl toluene sulfonate, sodium di-sec.-butyl naphthalene sulfonate, sodium diamyl sulfosuccinate and N-methyl-9-octadecenylamido sodium ethyl sulfonate

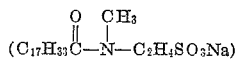

commonly known as Igepon T.

In producing the sulfur dioxide resins, any one of a number of unsaturated organic compounds may be used. Most of such reactants are those which will react with sulfur dioxide to produce heteropolymeric compounds, under the other conditions heretofore employed by the prior art. Most of such reactants contain an olefinic linkage, and may be represented by the formula

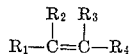

wherein $R_1$ and $R_2$ may be hydrogen, halogen, or alkyl, or $R_1$ may be a constituent of a carbocyclic ring in which $R_4$ is a member, and $R_3$ and $R_4$ may be hydrogen, alkyl, alkenyl, aryl, aralkyl, or have an acetylenic linkage, or substituted groups thereof wherein substituents such as halo, nitro, hydroxyl, carbocyclic, cyano, and the like may be present, or $R_4$ may be a constituent of a carbocyclic ring in which $R_1$ is also a member. In general the olefinic compound employed will not contain more than twenty carbon atoms per molecule. Examples of olefinic compounds which may be used include 1-butene, 2-butene, propylene, isobutylene, pentenes, hexenes, cyclohexene, butadiene, styrene, alpha-methyl styrene, alpha-chloro styrene, vinyl acetylenes, vinyl chloride, vinyl bromide, and the like. It is also frequently desired to employ a mixture of olefinic compounds, rather than a single olefinic compound, in carrying out the process of this invention.

When operating according to the manner herein described it is generally found that substantially equimolar proportions of olefinic compound and sulfur dioxide react together. However, it is sometimes desired to use a molar excess of sulfur dioxide, say a 2:1 mol ratio of sulfur dioxide to olefinic material. In Examples 1, 2, 4 and 5 the mol ratio of sulfur dioxide to olefinic material was 1.7:1, and in Example 3 this ratio was 2:1. In some cases it may even be desirable to use a higher ratio of the one reactant to the other, for example, a ratio of 5:1, or greater, depending upon operating conditions, olefinic material employed, amount of aqueous medium, etc., although it appears that, even in such cases, equimolar quantities of sulfur dioxide, and olefinic compound enter into reaction. Frequently it will be desirable to remove the reactants from the reaction zone, and separate unreacted materials, when between about 70 and about 97 per cent of the reactant present in the lesser amount has reacted. When some diolefins are used as reactants, under some conditions, these materials tend to undergo homopolymerization to form rubber-like products; such reactions are undesired in this invention and conditions should be chosen with such diolefinic reactants, to inhibit such homopolymerization and favor joint interreaction to produce heteropolymeric resins.

Catalysts applicable in this process are the same as those which have been found effective when carrying out the reaction between olefinic compounds and sulfur dioxide by methods heretofore employed. Examples of these catalytic materials include nitrates of the alkali metals and ammonium, nitric acid, potassium persulfate, hydrogen peroxide, organic peroxides, such as cumene hydroperoxide, peracetic acid, and the like. The amount of catalyst used may vary over a wide range and will depend upon the material chosen. In cases where alkali metal nitrates or ammonium nitrate are employed, the amount may vary from 0.03 to 0.60 part per 100 parts reactants with an amount ranging from 0.15 to 0.45 part being generally preferred. With other materials the quantity of catalyst used may be somewhat higher but in any event it is determined by the case at hand.

Temperatures for carrying out the resin-producing reactions of this invention will usually fall within the range of about 10 to about 140° F., with the narrower range 50 to 120° F. being most frequently preferred. However, in some instances it may be considered advisable to employ temperatures below 10° F. in order to get a more satisfactory reaction.

Obviously when polymerizations are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below freezing. It is generally preferred that the emulsion be of an "oil in water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Advantages of this invention are illustrated by the following examples. The reactants, and their proportions, and the other specific ingredients of the recipes are presented as being typical and should not be construed to limit the invention unduly.

*Example 1*

An olefin-sulfur dioxide resin latex was prepared by aqueous emulsion polymerization using the following recipe:

| | Parts by weight |
|---|---|
| 1-butene | 46.7 |
| Sulfur dioxide | 88.3 |
| Lithium nitrate | 0.5 |
| Sodium di-sec.-butyl naphthalene sulfonate | 4.0 |
| Water | 180.0 |

The reactants were emulsified in water and the mixture agitated throughout the reaction period while the temperature was held at 77° F. The reaction was stopped at the end of 2.5 hours, and the unreacted sulfur dioxide and olefin were vented from the latex. The latex, amounting to about 325 grams and containing about 4.5 grams of the emulsifying agent, was coagulated at room temperature (about 75° F.). Coagulation was accomplished by gradually adding about 210 milliliters of a one weight per cent solution of aluminum sulfate octadecahydrate while agitating the latex. The coagulum was obtained in the form of a uniform extremely fine, white precipitate.

*Example 2*

An olefin-sulfur dioxide resin latex was prepared by aqueous emulsion polymerization using the following recipe:

| | Parts by weight |
|---|---|
| 1-butene | 46.7 |
| Sulfur dioxide | 88.3 |
| Lithium nitrate | 0.5 |
| Sodium di-sec.-butyl naphthalene sulfonate | 4.0 |
| Water | 180.0 |

The reactants were emulsified in water and the mixture agitated throughout the reaction period while the temperature was held at 77° F. The reaction was stopped at the end of 2.5 hours, and the unreacted sulfur dioxide and olefin were vented from the latex. The latex was divided into several 32.5 gram portions, each containing about 0.45 gram of the emulsifying agent, and each portion was coagulated with 21 milliliters of a one weight per cent solution of aluminum sulfate octadecahydrate. Each coagulation was effected at a different temperature; both the latex and the coagulant solution were brought to this temperature before mixing. This resin has a minimum molding temperature of about 190° F.

The table lists the coagulation temperatures and shows the condition of the coagulum.

| Temperature, ° F. | Condition of Coagulum |
|---|---|
| 176 | Single large dense mass. |
| 167 | One lump, crumbled easily. |
| 158 | Granular crumb. |
| 140 | Small particles, coarse powder. |
| 122 | Very small particles, fine powder. |
| 104 | Do. |
| 86 | Do. |

Another resin latex, comprising the same resin but also comprising a plasticizer, so that the minimum molding temperature was quite low, could be coagulated to produce a crumb only at a temperature below 45° F.

*Example 3*

A 1-octene-sulfur dioxide resin latex was prepared by aqueous emulsion polymerization using the following recipe:

| | Parts by weight |
|---|---|
| 1-octene | 63.6 |
| Sulfur dioxide | 71.4 |
| Soluble ferric pyrophosphate | 0.5 |
| Sodium di-sec.-butyl naphthalene sulfonate | 4.0 |
| Water | 180.0 |

The reactants were emulsified in water and the mixture agitated throughout the reaction period while the temperature was held at 86° F. The reaction was stopped at the end of two hours, and the unreacted sulfur dioxide was vented from the latex. The latex was divided into portions and coagulated with aluminum sulfate solutions at various temperatures as in Example 1. The table lists the coagulation temperatures and shows the condition of the coagulum. The minimum molding temperature of this resin is about 135° F.

| Temperature ° F. | Condition of Coagulum |
|---|---|
| 131 | Granular to large lumps. |
| 113 | Small particles to granular. |
| 104 | Small particles. |
| 77 | Very small particles. |

*Example 4*

A 1-butene-sulfur dioxide resin latex was prepared by emulsion polymerization using the following recipe:

| | Parts by weight |
|---|---|
| 1-butene | 46.7 |
| Sulfur dioxide | 88.3 |
| Lithium nitrate | 0.5 |
| Sodium alkylbenzene sulfonate | 5.0 |
| Water | 180.0 |

The reactants were emulsified in water and the mixture agitated throughout the reaction period while the temperature was held at 77° F. The reaction was stopped at the end of four hours, and the unreacted sulfur dioxide and olefin were vented from the latex. The latex was divided into several portions, 32.5 gram portions, each containing about 0.46 gram of the emulsifying agent, and coagulated at 153° F. with 10 weight per cent aqueous solutions of the various coagulants listed below. All the coagula were of granular or crumb-like form.

| Coagulant | Milliliters of 10 Weight Percent Coagulant Solution Employed |
|---|---|
| Magnesium sulfate heptahydrate | 10 |
| Aluminum chloride hexahydrate | 4 |
| Magnesium chloride hexahydrate | 10 |
| Calcium chloride | 7 |
| Potassium aluminum sulfate dodecylhydrate | 6 |
| Aluminum sulfate octadecahydrate | 4 |

*Example 5*

A 1-butene-sulfur dioxide resin latex was prepared by aqueous emulsion polymerization using the following recipe:

| | Parts by weight |
|---|---|
| 1-butene | 46.7 |
| Sulfur dioxide | 88.3 |
| Lithium nitrate | 0.5 |
| Sodium lauryl sulfate | 5.0 |
| Water | 180.0 |

The reactants were emulsified in water and the mixture agitated throughout the reaction period while the temperature was held at 77° F. The reaction was stopped at the end of three hours, and the unreacted sulfur dioxide and olefin were vented from the latex. The latex was heated to 158° F., and was coagulated by addition of a 10 weight per cent aqueous solution of aluminum sulfate octadecahydrate. The coagulum was of the desired granular or crumb-like form.

As will be evident to those skilled in the art, various modifications of this invention can be made, or followed in the light of the foregoing disclosure and discussion, without departing from the spirit or scope of the disclosure or from the scope of the claims.

I claim:

1. An improved process for producing a granular heteropolymeric resin from 1-butene and sulfur dioxide, which comprises copolymerizing same in the presence of an aqueous emulsion and an emulsifying agent of the class consisting of organic sulfate and sulfonate emulsifying agents, adding to the resulting resin latex at a temperature between 140 and 175° F. an aqueous solution of aluminum sulfate in an amount between 90 and 250 per cent by weight of that stoichiometrically equivalent to said emulsifying agent, and recovering a resulting granular resin so produced.

2. An improved process for producing a granular heteropolymeric resin from sulfur dioxide and an unsaturated organic compound which reacts therewith to form a heteropolymer, which comprises copolymerizing said reactants in the presence of an aqueous emulsion, coagulating a resulting resin latex at a temperature 15 to 50° F. below the minimum molding temperature of said resin said temperature being such that the coagulum is free from a hard dense mass of resin and said temperature being above that at which a fine unfilterable resin powder is formed, and recovering a resulting granular resin so produced.

3. The process of claim 2 in which said resin is produced from 1-butene and sulfur dioxide and said temperature of coagulation is between 140 and 175° F.

4. The process of claim 2 in which said resin is produced from 1-octene and sulfur dioxide and said temperature is between 110 and 130° F.

5. An improved process for producing a granular heteropolymeric resin from sulfur dioxide and an unsaturated organic compound which reacts therewith to form a heteropolymer, which comprises copolymerizing said reactants in the presence of an aqueous emulsion, and an emulsifying agent of the class consisting of organic sulfate and sulfonate emulsifying agents, adding to a resulting resin latex at a temperature 15 to 50° F. below the minimum molding temperature of said resin that the coagulum is free from a hard dense mass of resin and above that at which a fine unfilterable resin powder is formed, an aqueous solution of a salt of a metal of the class consisting of the metals in groups II, IIIB, and IVB of the periodic table in an amount between 90 and 250 per cent by weight of that stoichiometrically equivalent to said emulsifying agent, and recovering a resulting granular resin so produced.

6. The process of claim 5 in which said resin is produced from 1-butene and sulfur dioxide and said temperature of coagulation is between 140 and 175° F.

7. The process of claim 5 in which said resin is produced from 1-octene and sulfur dioxide and said temperature is between 110 and 130° F.

8. The process of claim 5 wherein said metal is aluminum.

9. The process of claim 5 wherein said metal is calcium.

10. The process of claim 5 wherein said metal is lead.

11. The process of claim 5 wherein said metal is strontium.

12. An improved process for producing a granular heteropolymeric resin from 1-butene and sulfur dioxide, which comprises copolymerizing 1-butene and sulfur dioxide while said 1-butene is dispersed in an acidic aqueous medium in the presence of a molar excess of sulfur dioxide at a polymerization temperature between 50 and 120° F. and in the presence of an emulsifying agent of the class consisting of organic sulfate and sulfonate emulsifying agents, adding to a resulting resin latex at a temperature between 140 and 175° F. an aqueous solution of magnesium sulfate in an amount between 90 and 250 per cent by weight of that stoichiometrically equivalent to said emulsifying agent, and recovering a resulting granular resin so produced.

13. An improved process for producing an olefin-sulfur dioxide resin, which comprises copolymerizing sulfur dioxide and an olefin hydrocarbon having from four to eight carbon atoms per molecule while said olefin is dispersed in an acidic aqueous medium at a polymerization temperature between 10 and 140° F., and coagulating a resulting resin latex at a temperature 15 to 50° F. below the minimum molding temperature of said resin said temperature being such that the coagulum is free from a hard dense mass of resin and said temperature being above that at which a fine unfilterable resin powder is formed, and recovering a resulting granular resin so produced.

14. In the recovery of a heteropolymeric resin produced by copolymerization of sulfur dioxide with a normal butene dispersed in an aqueous medium in the presence of an emulsifying agent of the class consisting of organic sulfate and sulfonate emulsifying agents whereby a resin latex is produced, the improvement which comprises adding to said butene-sulfur dioxide resin latex at a temperature between 140 and 175° F. an aqueous solution of magnesium sulfate in an amount between 90 and 250 per cent by weight of that stoichiometrically equivalent to said emulsifying agent, and recovering a resulting granular resin so produced.

15. In the recovery of a heteropolymeric resin produced by copolymerization of sulfur dioxide with an unsaturated organic compound which reacts therewith to form a heteropolymer, while said organic compound is dispersed in an aqueous medium whereby a resin latex is obtained, the improvement which comprises coagulating said resin latex at a temperature 15 to 50° F. below the minimum molding temperature of said resin, said temperature being such that the coagulum is free from a hard dense mass of resin and said temperature being above that at which a fine unfilterable resin powder is formed, and recovering a resulting granular resin so produced.

16. An improved process for producing a granular heteropolymeric resin from sulfur dioxide and an unsaturated organic compound which reacts therewith to form a heteropolymer, which comprises co-polymerizing said reactants in the presence of an aqueous emulsion, and an emulsifying agent of the class consisting of organic sulfate and sulfonate emulsifying agents, adding to a resulting resin latex at a temperature in the range 15 to 50° F. below the minimum molding temperature of said resin and such that the coagulum is free from a dense, hard mass of resin and above that at which a fine unfilterable resin powder is formed, an aqueous solution of a salt of magnesium metal in an amount between 90 and 250 per cent by weight of that stoichiometrically equivalent to said emulsifying agent, and recovering a resulting granular resin so produced.

17. An improved process for producing an olefin-sulfur dioxide resin, which comprises copolymerizing sulfur dioxide and an olefin hydrocarbon having from four to eight carbon atoms per molecule while said olefin is dispersed in an acidic aqueous medium in the presence of an emulsifying agent of the class consisting of organic sulfate and sulfonate emulsifying agents at a polymerization temperature between 10 and 140° F., and coagulating a resulting resin latex at a temperature 15 to 50° F. below the minimum molding temperature of said resin, said temperature being such that the coagulum is free from a hard dense mass of resin and said temperature being above that at which a fine unfilterable resin powder is formed, and recovering a resulting granular resin so produced, the said coagulation being effected by addition to said latex of a water-soluble salt of a metal of the class consisting of the metals in groups II, IIIB and IVB of the periodic table in an amount between 90 and 250 per cent by weight of that stoichiometrically equivalent to said emulsifying agent.

18. A process for producing a heteropolymeric resin of controlled particle size from sulfur dioxide and an unsaturated organic compound which reacts therewith to form a heteropolymer, which comprises in the presence of an aqueous emulsion copolymerizing said reactants and coagulating a resulting resin latex at a raised temperature near the minimum molding temperature of the final resin but at a temperature which is sufficiently below said minimum molding temperature that the coagulum is free from a hard, dense mass of resin and above that at which a fine unfilterable resin powder is formed, and recovering a resulting granular resin so produced.

19. A process for producing a heteropolymeric resin of controlled particle size from sulfur dioxide and an unsaturated hydrocarbon which reacts therewith to form a heteropolymer, which comprises in the presence of an aqueous emulsion copolymerizing said reactants and coagulating a resulting resin latex at an elevated temperature near the minimum molding temperature of the final resin but at a temperature which is sufficiently below said minimum molding temperature that the coagulum is free from a hard, dense mass of resin and above that at which a fine unfilterable resin powder is formed, and recovering a resulting granular resin so produced.

20. A process for producing a heteropolymeric resin of controlled particle size from sulfur dioxide and an olefin hydrocarbon which reacts therewith to form a heteropolymer, which comprises in the presence of an aqueous emulsion copolymerizing said reactants and coagulating a resulting resin latex at an elevated temperature near the minimum molding temperature of the final resin but at a temperature which is sufficiently below said minimum molding temperature that the coagulum is free from a hard, dense mass of resin and above that at which a fine unfilterable resin powder is formed, and recovering a resulting granular resin so produced.

21. A process for producing a heteropolymeric resin of controlled particle size from sulfur dioxide and an aliphatic monoolefinic hydrocarbon which reacts therewith to form a heteropolymer, which comprises in the presence of an aqueous emulsion copolymerizing said reactants and coagulating a resulting resin latex at an elevated temperature near the minimum molding temperature of the final resin but at a temperature which is sufficiently below said minimum molding temperature that the coagulum is free from a hard, dense mass of resin and above that at which a fine unfilterable resin powder is formed, and recovering a resulting granular resin so produced.

22. A process for producing a heteropolymeric resin of controlled particle size from sulfur dioxide and 1-butene which reacts therewith to form a heteropolymer, which comprises in the presence of an aqueous emulsion copolymerizing said reactants and coagulating a resulting resin latex at an elevated temperature near the minimum molding temperature of the final resin but at a temperature which is sufficiently below said minimum molding temperature that the coagulum is free from a hard, dense mass of resin and above that at which a fine unfilterable resin powder is formed, and recovering a resulting granular resin so produced.

References Cited in the file of this patent

UNITED STATES PATENTS

| Number | Name | Date |
| --- | --- | --- |
| 2,371,719 | Starkweather | Mar. 20, 1945 |
| 2,392,756 | Mighton | Jan. 3, 1946 |
| 2,435,778 | Gracia | Feb. 10, 1948 |
| 2,531,403 | Crouch | Nov. 28, 1950 |